United States Patent Office 2,983,727
Patented May 9, 1961

2,983,727

2-AMINO-4-[BIS(2-HALOETHYL)AMINO] PYRIMIDINES

Douglas A. Lyttle and Harold G. Petering, Kalamazoo, Mich., assignors to The Upjohn Company, Kalamazoo, Mich., a corporation of Michigan No Drawing. Filed Dec. 17, 1957, Ser. No. 703,293

4 Claims. (Cl. 260—256.4)

This invention relates to novel organic compounds, and to a process for preparing them. It is more particularly directed to 2-amino-4-[bis(2-haloethyl)amino] pyrimidine, to a 2-amino-4-[bis(2-hydroxyethyl)amino] pyrimidine intermediate, and to a process for preparing the same.

The 2-amino-4-[bis(2-haloethyl)amino]pyrimidines of this invention having the following general structural formula:

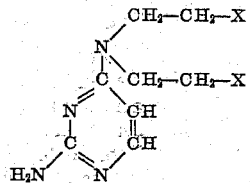

wherein X is a halogen atom having an atomic weight between 35 and 127.

The invention also includes the addition salts of pharmacologically acceptable acids which coordinate with the basic amino group in the 2-position. The acid addition salts are readily formed with the hydrogen halide which is formed during the halogenation reaction. Hence, the compounds are easily recoverable in the form of their acid addition salts.

The compounds of this invention are useful in the control of certain yeasts such as *Torula albida* and *Kloeckera brevis*; and in the control of fungal pathogens such as *Microsporum canis* and *Trichophyton interdigitalis*. They are also phytotoxic and useful for the control of weeds. Moreover, their mutagenic character provides controllable means for inducing mutations in useful microorganisms such as antibiotic-producing or acid-producing organisms such as *Streptomyces*, *Penicillium*, and *Aspergillae* where more productive strains are continually being sought. Since the rate of gene mutation is accelerated, and therefore the chance of an improved strain occurs more frequently than under natural conditions, the selective process is enhanced.

The compounds of the invention can be prepared by introduction of a bis(2-hydroxyethyl)amino group at the 4-position of 2-amino pyrimidine, followed by halogen substitution of the hydroxyl groups.

The 2-amino-4-[bis(2-hydroxyethyl)amino]pyrimidine intermediate can be readily prepared by condensing a 2-aminopyrimidine having a leaving group in the 4-position with diethanolamine. Suitable 2-amino-4-substituted pyrimidines are: 2-amino-4-chloropyrimidine, 2-amino-4-bromopyrimidine, 2-amino-4-mercaptopyrimidine, 2-amino-4-methylmercaptopyrimidine, 2-amino-4-ethylmercaptopyrimidine, 2-amino-4-carboxymethylmercaptopyrimidine, or a sulfonate ester leaving group, such as 2-amino-4-mesyloxypyrimidine, 2-amino-4-tosyloxypyrimidine, or 2-amino-4-brosyloxypyrimidine, and the like.

Halogen substitution of the bis(2-hydroxyethyl)amino intermediate is accomplished by methods commonly known in the art. For example, a halogenating agent such as thionyl chloride or thionyl bromide, preferably in the presence of an inert solvent, reacts with said intermediate to yield the 2-amino-4-[bis(2-chloroethyl)-amino]pyrimidine hydrochloride or 2-amino-4-[bis-(2-bromoethyl)amino]pyrimidine hydrobromide. Other halogenating agents can be used such as phosphorus trichloride or tribromide, phosphoryl chloride, or bromide, and phosphorus pentachloride or pentabromide. Suitable inert solvents for the halogenation reaction include chloroform, benzene, toluene, diethylene glycol dimethyl ether, xylene, dimethylformamide, and the like.

The free amino group in the 2-position is neutralized with the hydrogen halide produced during the halogenation reaction and the corresponding hydrohalic acid addition salt is formed. Hence, the compounds of the invention can be purified in this form, or the free base can be obtained by neutralizing with alkali. Advantageously, the free base can be prepared by reacting the hydrohalic acid addition salt with a weakly basic anion exchange resin such as Amberlite IR-4 and -4b (phenol-formaldehyde type resin) which will adsorb the hydrogen halide and release the amine.

The iodine analogue, i.e., 2-amino-4-[bis(2-iodoethyl)-amino]pyrimidine, is prepared by a metathetic reaction using an alkali-metal iodide such as sodium or potassium iodide with either 2-amino-4-[bis(2-chloroethyl)amino]-pyrimidine or, preferably, 2-amino-4-[bis(2-bromoethyl)-amino]pyrimidine.

Pharmacologically acceptable acid addition salts are prepared from any free base of the invention by neutralizing the free base with a pharmacologically acceptable acid such as hydrochloric, hydrobromic, hydriodic, sulfuric, nitric, phosphoric, acetic, isethionic acid, and the like.

The following examples are illustrative of the process and products of the present invention, but are not to be construed as limiting.

EXAMPLE 1

A. *Preparation of 2-amino-4-[bis(2-hydroxyethyl)-amino]pyrimidine*

A mixture of 129.5 grams (1.0 mole) of 2-amino-4-chloropyrimidine, 210.3 grams (2.0 moles) of diethanolamine, and 1700 milliliters of absolute ethanol was heated with stirring and refluxed for 3.5 hours. The 2-amino-4-chloropyrimidine dissolved slowly. After the refluxing period, the solution was slowly cooled to room temperature (about 20 to 25 degrees centigrade) and was kept at room temperature for two days. A precipitate that accumulated was removed by filtration, and found to be mostly unreacted starting material. The solution was evaporated under reduced pressure in order to remove the volatile matter, and the oil that remained was dissolved in 1.5 volumes of methanol. The methanol solution was seeded with crystals from an earlier preparation, and crystallization was allowed to proceed for eight hours at room temperature followed by about fifteen hours at four degrees centigrade. The crystals were recovered and washed with ethanol. Recrystallization from methanol yielded 67.8 grams of 2-amino-4-[bis(2-hydroxyethyl)amino]pyrimidine which had a melting point of 143 to 145 degrees centigrade. An analytical sample was obtained by recrystallization from isopropyl alcohol followed by recrystallization from methanol.

*Analysis.*—Calc'd for $C_8H_{14}N_4O_2$: C, 48.47; H, 7.12; N, 28.27. Found: C, 48.65; H, 6.82; N, 28.78.

B. Preparation of 2-amino-4-[bis(2-chloroethyl)amino]-pyrimidine hydrochloride A quantity, 8.31 grams (0.05 mole) of 2-amino-4-[bis-(2-hydroxyethyl)amino]pyrimidine was mixed with fifty milliliters of dimethylformamide. Twelve and one-half grams (0.105 mole) of thionyl chloride was added in small portions. The additions required about 45 minutes, because the reaction is exothermic and the heat generated had to be dissipated by a coolant in order to maintain the temperature below thirty degrees centigrade. A yellow color that formed after each addition of thionyl chloride was allowed to fade before another portion was added. The mixture remained yellow after the final portion was added. It was stirred for fifteen minutes at room temperature, and then 225 milliliters of benzene was added. The crystals that formed were recovered on a filter, washed with benzene, and dried. This material weighed 11.61 grams (85.6 percent yield) and melted (with decomposition) at 209 degrees centigrade. After recrystallization from a mixture of 250 milliliters of absolute ethanol and ten milliliters of 95 percent ethanol, 6.46 grams of 2-amino-4-[bis(2-chloroethyl)amino]pyrimidine hydrochloride was obtained. Its melting point was 211 to 213.5 degrees centigrade (with decomposition). A second crop of crystals (2.67 grams) was obtained by concentrating the mother liquors. The melting point was 206 to 209 degrees centigrade (with decomposition).

*Analysis.*—Calc'd for $C_8H_{13}Cl_3N_4$: C, 35.38; H, 4.82; N, 20.63; Cl (total), 39.17; Cl (ionic), 26.11. Found: C, 35.96; H, 4.94; N, 19.57; Cl (total), 39.09; Cl (ionic), 26.18.

According to the foregoing analytical data, this compound has two ionic chlorine atoms. It is believed that the 2-amino-4-[bis(2-haloethyl)amino]pyrimidine of this invention in the form of the free base exist as the internal quaternary ammonium complex 5-amino-1-(2-haloethyl)-1H-imidazo[1,2-c]pyridinium halide:

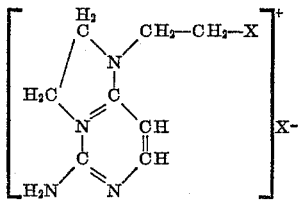

wherein X is a halogen atom as defined above. Intramolecular cyclization of one of the 2-haloethyl groups with a ring nitrogen, in the manner shown, would account for the presence of the ionic halogen atom.

EXAMPLE 2

*Preparation of 2-amino-4-[bis(2-hydroxyethyl)amino] pyrimidine*

The starting material recovered in Example 1, part A (weighing 50.6 grams) was mixed with 2.5 equivalents of diethanolamine, two milliliters of concentrated hydrochloric acid, and 500 milliliters of absolute ethanol and refluxed for 4.5 hours. The volatile matter was then removed by distillation at reduced pressure, and the oil that remained was dissolved in 200 milliliters of methanol and seeded with crystals of product. The solution was kept in a refrigerator for several days. The gummy solid material was recovered by filtration and was washed with ethanol. It was recrystallized from ethanol, and 33.4 grams of 2-amino-4-[bis(2-hydroxyethyl)amino]pyrimidine was recovered. This product melted at 142 to 144 degrees centigrade.

EXAMPLE 3

*Preparation of 2-amino-4-[bis(2-bromoethyl)amino]-pyrimidine hydrobromide*

Following the procedure of Example 1, part B, but substituting thionyl bromide for thionyl chloride, 2-amino-4-[bis(2-bromoethyl)amino]pyrimidine hydrobromide is obtained.

EXAMPLE 4

*Preparation of 2-amino-4-[bis(2-chloroethyl)amino]-pyrimidine*

Five (5.0) grams of 2-amino-4-[bis(2-chloroethyl)-amino]pyrimidine hydrochloride was dissolved in water (50 milliliters) and portions of Amberlite IR-4 added until the mixture was pH 8. The mixture was then stirred for two hours at room temperature and filtered. The water was removed by evaporation under reduced pressure, leaving the crystalline free base, 2-amino-4-[bis(2-chloroethyl)amino]pyrimidine.

EXAMPLE 5

*Preparation of 2-amino-4-[bis(2-chloroethyl)amino]-pyrimidine acetate*

Three (3.0) grams of 2-amino-4-[bis(2-chloroethyl)-amino]pyrimidine is dissolved in thirty milliliters of water and 0.76 grams of acetic acid are slowly added with stirring. The water is then evaporated under reduced pressure and 2-amino-4-[bis(2-chloroethyl)amino]pyrimidine acetate is obtained. Following the same procedure the sulfuric, nitric, phosphoric, and isethionic acid addition salts of 2-amino-4-[bis(2-chloroethyl)amino]pyrimidine, 2-amino-4-[bis(2-bromoethyl)amino]pyrimidine, and 2-amino-4-[bis(2-iodoethyl)amino]pyrimidine are obtained.

It is to be understood that the invention is not to be limited to the exact details of operation or exact compounds shown and described, as obvious modifications and equivalents will be apparent to one skilled in the art, and the invention is therefore to be limited only by the scope of the appended claims.

We claim:
1. 2 - amino - 4 - [bis(2 - haloethyl)amino]pyrimidine wherein "halo" represents a halogen having an atomic weight between 35 and 127.
2. 2-amino-4-[bis(2-haloethyl)amino]pyrimidine acid addition salts wherein "halo" is a halogen having an atomic weight between 35 and 127.
3. 2-amino-4-[bis(2-chloroethyl)amino]pyrimidine hydrochloride.
4. 2-amino-4-[bis(2-hydroxyethyl)amino]pyrimidine.

References Cited in the file of this patent
UNITED STATES PATENTS

| | | |
|---|---|---|
| 2,455,396 | Adams et al. | Dec. 7, 1948 |
| 2,844,577 | Acker | July 22, 1958 |

OTHER REFERENCES

Fieser and Fieser: Organic Chemistry, pages 147–148 and 962 (2nd ed.), 1950.

Whitmore: Organic Chemistry, 2nd ed., page 74 (1952).